(12) United States Patent
Yin et al.

(10) Patent No.: US 11,597,159 B2
(45) Date of Patent: Mar. 7, 2023

(54) CONTROL METHOD FOR DIGITAL LIGHT PROCESSING (DLP) PRINTING BASED ON ABSORBANCE OF PHOTOCURABLE MATERIAL

(71) Applicant: ZHEJIANG UNIVERSITY, Hangzhou (CN)

(72) Inventors: Jun Yin, Hangzhou (CN); Yang Li, Hangzhou (CN); Yifan Wang, Hangzhou (CN); Qijiang Mao, Hangzhou (CN); Jianzhong Fu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/762,361

(22) PCT Filed: Aug. 28, 2020

(86) PCT No.: PCT/CN2020/112094
§ 371 (c)(1),
(2) Date: Mar. 21, 2022

(87) PCT Pub. No.: WO2022/000748
PCT Pub. Date: Jan. 6, 2022

(65) Prior Publication Data
US 2022/0347931 A1 Nov. 3, 2022

(30) Foreign Application Priority Data

Jul. 1, 2020 (CN) .......................... 202010625870.3

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/129* (2017.08); *B29C 64/264* (2017.08); *B33Y 50/02* (2014.12)

(58) Field of Classification Search
CPC ... B29C 64/393; B29C 64/129; B29C 64/264; B33Y 50/02
See application file for complete search history.

(56) References Cited

U.S. PATENT DOCUMENTS 10,597,289 B1 * 3/2020 Woolley ............. B81C 99/0095
2019/0006545 A1 * 1/2019 Ayzner ................ H01L 51/0046

FOREIGN PATENT DOCUMENTS

| CN | 110370625 A | 10/2019 |
|---|---|---|
| JP | 2006227221 A | 8/2006 |

* cited by examiner

*Primary Examiner* — Thomas C Lee
*Assistant Examiner* — Michael Tang
(74) *Attorney, Agent, or Firm* — Bayramoglu Law Offices LLC

(57) ABSTRACT

A control method for digital light processing (DLP) printing based on an absorbance of a photocurable material includes: adding a light absorber to a photocurable material for DLP printing, measuring a liquid absorbance and a solid absorbance per unit thickness of the photocurable material at different concentrations of the light absorber, calculating an actual solid-liquid absorbance ratio, and comparing the ratio with a theoretically predicted value of a solid-liquid absorbance ratio to obtain an actual concentration of the light absorber in the photocurable material; measuring a curing threshold time of the photocurable material, substituting the solid absorbance per unit thickness, the liquid absorbance per unit thickness and the curing threshold time into a single-layer curing model to obtain a relationship between an exposure time $t_T$ and a curing thickness H; this method (Continued)

can accurately obtain the exposure time corresponding to the thickness of any material that needs to be printed.

4 Claims, 3 Drawing Sheets

(51) Int. Cl.
    *B29C 64/264*     (2017.01)
    *B29C 64/129*     (2017.01)

CONTROL METHOD FOR DIGITAL LIGHT PROCESSING (DLP) PRINTING BASED ON ABSORBANCE OF PHOTOCURABLE MATERIAL

CROSS REFERENCE TO THE RELATED APPLICATIONS

This application is the national phase entry of International Application No. PCT/CN2020/112094, filed on Aug. 28, 2020, which is based upon and claims priority to Chinese Patent Application No. 202010625870.3, filed on Jul. 1, 2020, the entire contents of which are incorporated herein by reference.

TECHNICAL FIELD

The present invention belongs to the technical field of additive manufacturing (AM), and relates to a printing control method, in particular to a printing control method by obtaining a digital light processing (DLP) printing parameter of a photocurable material based on an absorbance of the photocurable material.

BACKGROUND

In the DLP technology, a digital micromirror device (DMD) reflects ultraviolet (UV) light carrying graphic information to convert a photosensitive resin in a liquid state into a solid with a certain thickness, and a single-layer forming process is repeated many times to form a three-dimensional (3D) model. An accurate relationship between the exposure time and the forming thickness indicates a desired DLP forming result.

Traditionally, the photocurable material is exposed for a series of times to obtain the corresponding curing thickness, so as to obtain a relationship between the exposure time and the forming thickness. The basic functional form of this relationship is derived based on Beer-Lambert law. Then, the relationship curve between the exposure time and the forming thickness is obtained by fitting multiple time-thickness data measured in experiments, through which the exposure time corresponding to any desired curing thickness can be obtained.

However, this method has the following obvious shortcomings:

1. Accurate data fitting requires a lot of materials for forming experiments to acquire multiple time-thickness data points, which wastes materials and is not straightforward and cumbersome due to the involvement of measurement and calculation of the formed structure.

2. The data of the forming experiment are not scalable, and the forming experiment needs to be re-run if the material composition changes, resulting in material waste.

3. For soft materials, the layer thickness measurement model is hard to form, making it hard to accurately obtain the thickness of the formed layer and the time-thickness data points, which affects the accurate forming of the soft materials.

SUMMARY

In order to solve the problems existing in the prior art, the present invention provides a DLP printing control method. The present invention introduces a solid absorbance per unit thickness, a liquid absorbance per unit thickness and a curing threshold time of the photocurable material according to the properties of the photocurable material, and establishes a single-layer curing model based on energy accumulation. Based on this model, the present invention obtains a relationship between an exposure time and a forming thickness, and introduces a solid-liquid absorbance ratio as an evaluation criterion to calibrate an error between an actual forming thickness and a theoretically predicted forming thickness, so as to obtain an accurate working curve. The present invention avoids repeating multiple forming experiments, avoids material waste, improves the prediction accuracy of the relationship between the exposure time and the layer thickness, and enables accurate control of the printing process.

To achieve the above objective, the present invention adopts the following technical solution:

A control method for DLP printing based on an absorbance of a photocurable material includes six steps as follows:

adding a light absorber to the photocurable material, and subjecting the photocurable material with the light absorber to photocuring for DLP printing, wherein a printing process includes:

1) measuring a liquid absorbance $A_l$ and a solid absorbance $A_s$ per unit thickness of the photocurable material with the light absorber under different concentrations of the light absorber, where when a transmittance of the photocurable material changes, a thickness of the photocurable material changes accordingly;

2) calculating a ratio of the liquid absorbance $A_l$ to the solid absorbance $A_s$ per unit thickness that change with the concentrations of the light absorber as an actual solid-liquid absorbance ratio $R_{sl}$.

$$R_{sl}=A_s/A_l$$

3) comparing the actual solid-liquid absorbance ratio with a theoretically predicted value of a solid-liquid absorbance ratio:

if a difference between the actual solid-liquid absorbance ratio and the theoretically predicted value of the solid-liquid absorbance ratio reaches more than 10% of the theoretically predicted value of the solid-liquid absorbance ratio, determining that the actual solid-liquid absorbance ratio deviates from the theoretically predicted value of the solid-liquid absorbance ratio, and taking a concentration range of the light absorber corresponding to the deviating actual solid-liquid absorbance ratio as an actual concentration of the light absorber in the photocurable material;

4) determining, by a photorheological test, a curing threshold time $t_T$ of the photocurable material under the concentration of the light absorber determined in step 3;

wherein the curing threshold time $t_T$ is determined by a photorheological test;

the curing threshold time is determined by a photorheological test, and the solid absorbance per unit thickness and the liquid absorbance per unit thickness are obtained; and these parameters are input into a theoretical numerical model to obtain a corresponding DLP printing parameter;

5) substituting the solid absorbance per unit thickness, the liquid absorbance per unit thickness and the curing threshold time of the photocurable material into a single-layer curing model as follows to obtain a relationship between an exposure time $t_H$ and a curing thickness H:

$$t_H = t_T \cdot \left[ \frac{A_s - A_l}{A_s} + \frac{A_l}{A_s} \cdot e^{(-A_s \cdot H)} \right]$$

wherein $t_T$ denotes the curing threshold time, H denotes the curing thickness, and e denotes a natural constant;

6) substituting, in actual printing, a desired curing thickness H into the single-layer curing model to obtain the exposure time $t_H$, and performing a DLP printing control according to the exposure time $t_H$.

The single-layer curing model proposed in the present invention is a light-energy-based photocuring model, which includes the liquid absorbance and solid absorbance per unit thickness and a curing energy threshold.

The curing energy threshold is a critical value. When the light energy accumulation of light reaching a fixed curing depth from the beginning of irradiation reaches the curing energy threshold, the depth represents the curing depth, and a liquid is cured into a solid. As the depth increases, the optical energy density decreases and the energy accumulation decreases. The curing energy threshold is obtained by multiplying the curing threshold time by the energy density.

In step 3), the theoretically predicted value $R'_{sl}$ of the solid-liquid absorbance ratio is calculated as follows:

$$R'_{sl} = \frac{a_1 c_d + b_1}{a_2 c_d + b_2}$$

where, $R'_{sl}$ denotes the theoretically predicted value of the solid-liquid absorbance ratio; $a_1$ denotes a slope of linear fitting data of a relationship between the solid absorbance per unit thickness and a concentration of the light absorber; $a_2$ denotes a slope of linear fitting data of a relationship between the liquid absorbance per unit thickness and the concentration of the light absorber; $b_1$ denotes an intercept of the linear fitting data of the relationship between the solid absorbance per unit thickness and the concentration of the light absorber; $b_2$ denotes an intercept of the linear fitting data of the relationship between the liquid absorbance per unit thickness and the concentration of the light absorber; and $c_d$ denotes the concentration of the light absorber. In a specific implementation, $a_1$, $b_1$, $a_2$ and $b_2$ are obtained by fitting data points of the absorbance per unit thickness and the concentration of the light absorber obtained by measurement.

Specifically, the ratio of the solid absorbance per unit thickness to the liquid absorbance per unit thickness obtained by changing the concentration of the light absorber in the photocurable material is equivalent to a functional relationship of the concentration of the light absorber.

The present invention proposes the solid absorbance for the first time in DLP photocuring. In the method of the present invention, the solid absorbance is measured by using an absorbance measuring apparatus shown in FIGS. 1(a) and 1(b).

In step 1), the liquid absorbance $A_l$ and the solid absorbance $A_s$ per unit thickness are measured by an absorbance measuring apparatus; the absorbance measuring apparatus comprises a transparent upper end cover, a tank wall and a transparent lower end cover; the transparent upper end cover and the transparent lower end cover are connected through the tank wall; the transparent upper end cover, the tank wall and the transparent lower end cover together form a sealed tank; an UV light source is provided above the transparent upper end cover; a photometer is provided under the tank; and the photometer is connected to a display screen. During the test, a photocurable material to be measured fully fills the tank.

A measuring process of the absorbance measuring apparatus includes:

keeping the tank as an empty tank, that is, not placing any material in the tank; emitting, by the UV light source, UV light vertically into the tank from above the transparent upper end cover; receiving, by the photometer under the tank, the UV light source passing through the empty tank at a photosensitive position; and displaying, by the display screen of the photometer, an optical density as an incident optical density $I_i$;

placing a photocurable material to be measured into the tank, such that the photocurable material to be measured fully fills the tank, emitting, by the UV light source, UV light vertically into the tank from above the transparent upper end cover; receiving, by the photometer under the tank, the UV light passing through the photocurable material, at the photosensitive position; and displaying, by the display screen of the photometer, an initial optical density as a liquid outgoing optical density $I_{lo}$ of the UV light passing through the photocurable material with a thickness;

continuously emitting, by the UV light source, UV light for irradiating, such that the photocurable material in the tank begins to transform from the liquid state to a solid state; displaying, by the display screen of the photometer, a value of an optical density remaining stable over time; and taking the value as a solid outgoing optical energy density $I_{so}$ of the UV light passing through the photocurable material with the thickness, where h is an internal height of the tank, that is, the thickness of the photocurable material fully filling the tank;

calculating the liquid absorbance $A_l$ and the solid absorbance $A_s$ per unit thickness according to the following formulas:

$$A_l = \frac{1}{h} \cdot \ln\left(\frac{I_{lo}}{I_i}\right)$$

$$A_s = \frac{1}{h} \cdot \ln\left(\frac{I_{so}}{I_i}\right)$$

where, h is the thickness of the photocurable material fully filling the tank.

In the present invention, the liquid absorbance and solid absorbance of the material are different parameters and need to be measured separately.

Specifically, regarding the curing threshold energy proposed in the present invention, in curing, the process of liquid-to-solid transformation does not occur at the onset of irradiation. There is a stage in which the degree of cross-linking gradually increases but no solid appears between the beginning of the material being exposed to the UV light and the transformation into a solid. The energy required for this stage is called the curing threshold energy. The solid appears when the energy accumulates to this threshold, and the time required to reach this curing threshold energy is called the curing threshold time.

Specifically, according to the Beer-Lambert law, the optical density gradually weakens with the depth, so the energy accumulation also gradually weakens with the depth. Regarding the curing depth proposed by the present invention, when the accumulated energy from a certain depth from a forming surface reaches the curing threshold energy, the liquid at this depth begins to transform into a solid. The liquid before this depth has been cured before the depth reaches the threshold energy, so the depth just reaching the curing threshold energy is the curing depth of the liquid at this time.

The present invention has the following beneficial effects:

The present invention introduces a simple method to tests the properties of the photocurable material, including the liquid absorbance per unit thickness, the solid absorbance per unit thickness and the curing threshold time. The present invention directly and accurately obtains the DLP printing parameter of the material, avoids complicated and repeated forming experiments, saves materials, and can obtain a more accurate working curve compared with the traditional method.

Based on the material absorbance and light energy, the DLP printing parameter of the photocurable material can also be obtained through a simple test when the material composition changes, eliminating the need for repeated forming experiments. The present invention does not rely on the mechanical properties and properties-related characteristics of the material after forming. Therefore, the present invention can also obtain accurate printing parameters for printing control for materials that have weak mechanical properties and are not easily formed.

BRIEF DESCRIPTION OF THE DRAWINGS

FIG. 1(a) is an external view of the absorbance measuring apparatus for a photocurable material according to the present invention;

FIG. 1(b) is a half section of the absorbance measuring apparatus for a photocurable material according to the present invention;

FIG. 2(a) is a schematic view of measuring an incident optical density according to the present invention;

FIG. 2(b) is a schematic view of measuring a liquid outgoing optical density according to the present invention;

FIG. 2(c) is a schematic view of measuring a solid outgoing optical density according to the present invention.

Figure 1A:
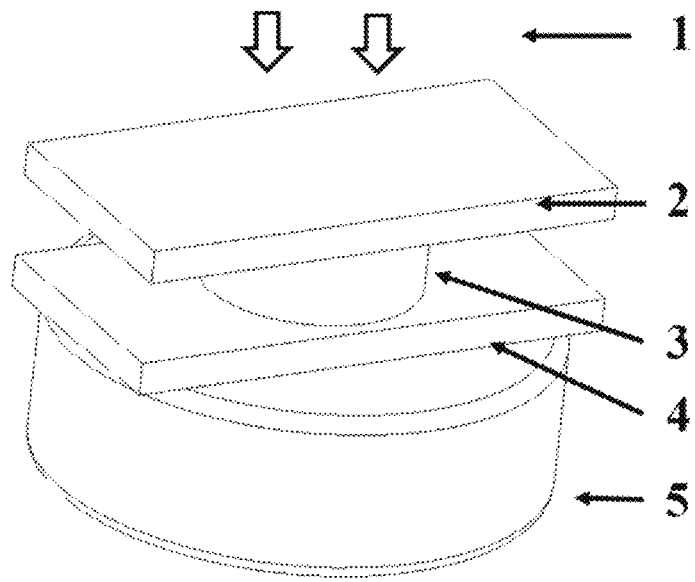
FIGS. 1(a) and 1(b) are schematic views of an absorbance measuring apparatus for a photocurable material according to the present invention.

Reference Numerals: 1. UV light source; 2. transparent upper end cover; 3. tank wall; 4. transparent lower end cover; 5. photometer measuring head; 6. photometer measuring surface; 7. empty tank; 8. tank fully filled with photocurable material to be measured in a liquid state; 9. tank fully filled with photocurable material to be measured in a solid state; and 10. display screen of photometer.

Figure 3A:
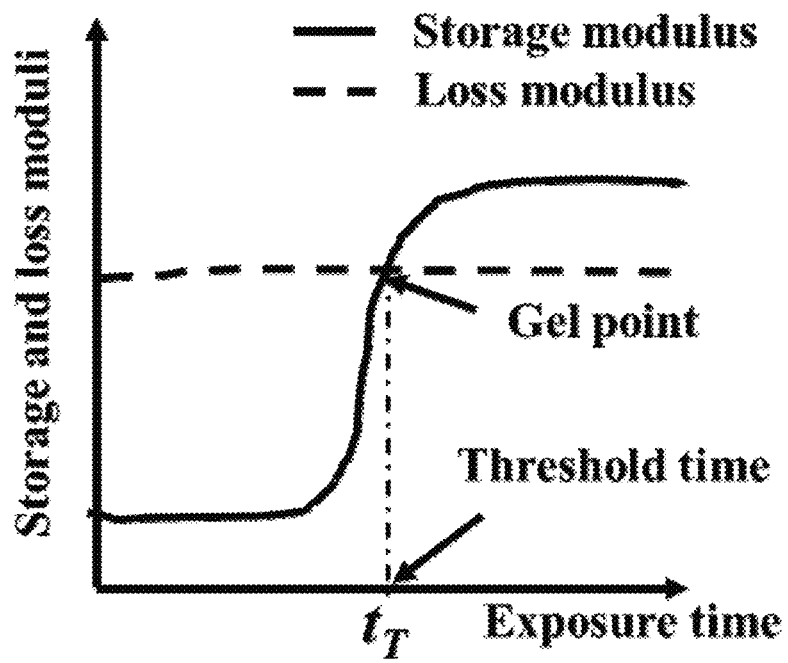
FIGS. 3(a) and 3(b) respectively show data to be measured and a selection method of a preferred concentrate range of a light absorber in a method for acquiring a DLP printing parameter according to the present invention.

FIG. 3(a) shows a photorheological test result and a method for measuring a curing threshold time by a photorheological test; and FIG. (3b) shows a method for selecting a preferred concentrate range of a light absorber based on a solid-liquid absorbance ratio.

DETAILED DESCRIPTION OF THE EMBODIMENTS

In order to make the objectives and advantages of the technologies and devices mentioned in the present invention clearer, the technologies and devices of the present invention will be further described below with reference to the embodiments and the drawings.

The specific steps of the method are described in detail below based on the specific implementations and the drawings.

Figure 1B:
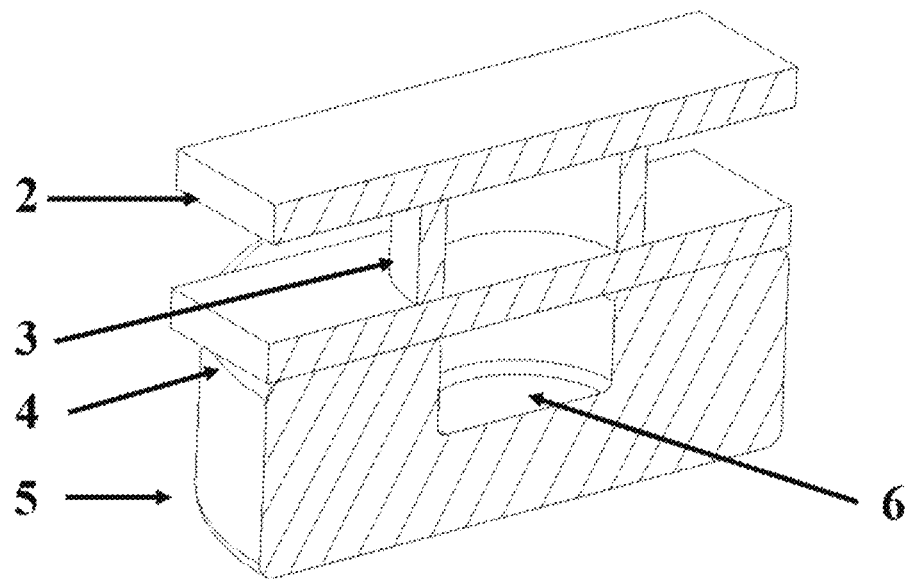

An absorbance per unit thickness includes a liquid absorbance $A_l$ and a solid absorbance $A_s$ per unit thickness. The absorbance is measured as follows:

1. As shown in FIGS. 1(a) and 1(b), an UV light source 1, a transparent upper end cover 2, a tank wall 3, a transparent lower end cover 4 and a photometer measuring head 5 are arranged in order from top to bottom.

Figure 2A:
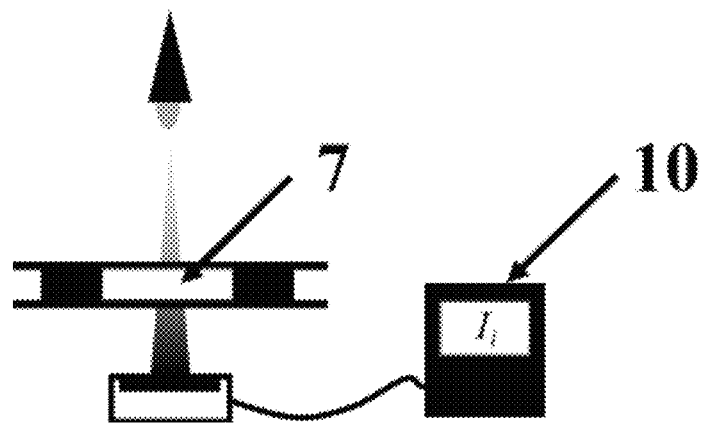
FIGS. 2(a)-2(c) are schematic views of measuring an absorbance of a photocurable material according to the present invention.

2. As shown in FIG. 2(a), an incident optical density $I_i$ is measured. A closed tank composed of the transparent upper end cover 2, the tank wall 3 and the transparent lower end cover 4 is kept as an empty tank 7. The UV light source 1 emits UV light vertically from above the transparent upper end cover 2 to pass through a space enclosed by the tank wall 3. The UV light passes through the transparent lower end cover 4 and reaches a photometer measuring surface 6 of the photometer measuring head 5. Readout on the display screen 10 of the photometer is recorded as the incident optical density $I_i$.

Figure 2B:
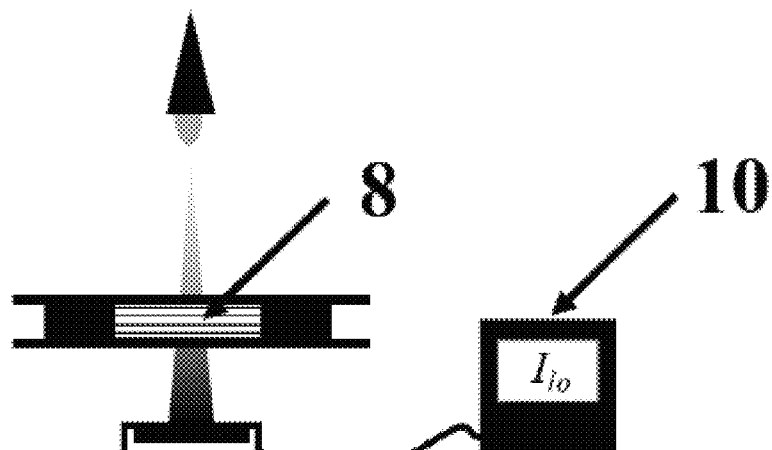

3. As shown in FIG. 2(b), a liquid outgoing optical density $I_{lo}$ is measured. A photocurable material to be measured in a liquid state is placed in the closed tank composed of the transparent upper end cover 2, the tank wall 3 and the transparent lower end cover 4, such that the tank is fully filled with the photocurable material 8 to be measured in a liquid state. The UV light source 1 emits UV light vertically from above the transparent upper end cover 2 to pass through the photocurable material in the liquid state enclosed by the tank wall 3. The UV light passes through the transparent lower end cover 4 to the photometer measuring surface 6 of the photometer measuring head 5. Readout on the display screen 10 of the photometer is recorded as the liquid outgoing optical density $I_{lo}$.

Figure 2C:
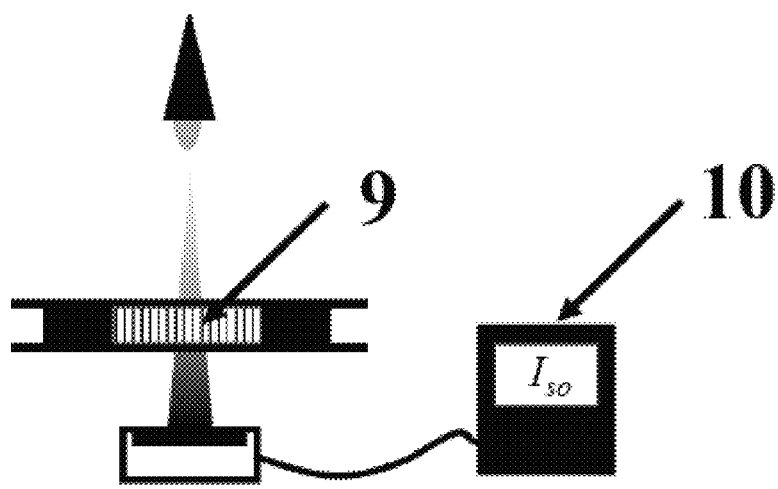

4. As shown in FIG. 2(c), a solid outgoing optical density $I_{so}$ is measured. This step follows Step 3. The UV light source 1 irradiates the photocurable material in the liquid state, such that the photocurable material in the liquid state changes from the liquid state to a solid state. Finally, the tank is fully filled with a solid 9 formed by curing the photocurable liquid to be measured. A stable readout on the display screen 10 of the photometer is recorded as the solid outgoing optical density $I_{so}$.

5. The photocurable material's liquid absorbance $A_l$ per unit thickness and solid absorbance $A_s$ per unit thickness are calculated:

$$A_l = \frac{1}{h} \cdot \ln\left(\frac{I_{lo}}{I_i}\right)$$

$$A_s = \frac{1}{h} \cdot \ln\left(\frac{I_{so}}{I_i}\right)$$

where, a thickness of the tank wall is h, so the thickness of the photocurable material in the liquid state that fully fills the tank is h, which is also the thickness of the photocurable material in the solid state.

Figure 3B:
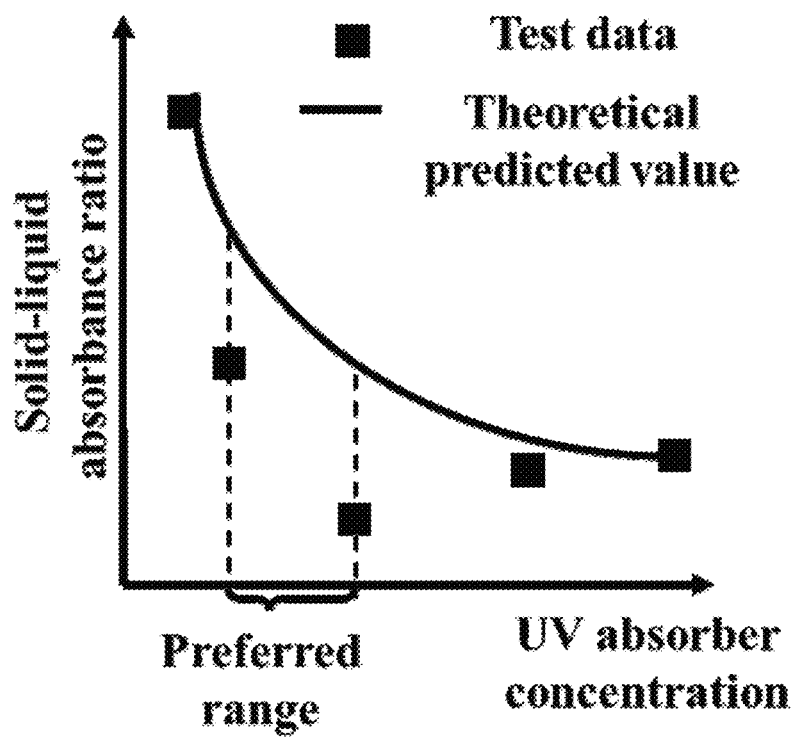

The predicted thickness of a formed layer is deviating from the actual thickness, and the accurately predicted thickness can be acquired by adjusting a concentration of a light absorber. As shown in the figure, a method for selecting a preferred concentration range of a light absorber includes the following steps:

The concentration of the light absorber added into the photocurable material to be measured is adjusted. The liquid absorbance $A_l$ and the solid absorbance $A_s$ per unit thickness under different concentrations of the light absorber are measured according to the above-mentioned measurement method of the absorbance per unit thickness. A series of data points are acquired for an absorbance-concentration relationship. The liquid absorbance $A_l$ per unit thickness and the concentration $c_d$ of the light absorber as well as the solid absorbance $A_s$ per unit thickness and the concentration $c_d$ of the light absorber are linearly fitted by mathematical processing software Origin. A ratio of the fitted relations is calculated:

$$R'_{sl} = \frac{a_1 c_d + b_1}{a_2 c_d + b_2}$$

where, $R'_{sl}$ denotes the theoretically predicted value of the solid-liquid absorbance ratio; $a_1$ denotes a slope of linear fitting data of the solid absorbance per unit thickness and the concentration of the light absorber; $a_2$ denotes a slope of linear fitting data of the liquid absorbance per unit thickness and the concentration of the light absorber; $b_1$ denotes an intercept of the linear fitting data of the solid absorbance per unit thickness and the concentration of the light absorber; $b_2$ denotes an intercept of linear fitting data of the liquid absorbance per unit thickness and the concentration of the light absorber; and $c_d$ denotes the concentration of the light absorber. The theoretically predicted values of the solid-liquid absorbance ratio are obtained, as shown in FIG. 3(b). The data points of the solid-liquid absorbance ratio obtained from the actually measured values are compared with the theoretically predicted values, as shown in FIG. 3(b). Some values of the actual solid-liquid absorbance ratio deviate from the theoretically predicted values of the solid-liquid absorbance ratio. If a difference between the actual solid-liquid absorbance ratio and the theoretically predicted value of the solid-liquid absorbance ratio reaches more than 10% of the theoretically predicted value of the solid-liquid absorbance ratio, it is considered that the value of the actual solid-liquid absorbance ratio deviates from the theoretically predicted value of the solid-liquid absorbance ratio. A concentration range of the light absorber corresponding to the deviating actual solid-liquid absorbance ratio is taken as an actual preferred concentration range of the light absorber in the photocurable material. In order to obtain a more accurate preferred concentration range, the number of measurement points for the solid-liquid absorbance ratio can be increased. Since only the apparatus shown in FIGS. 1(a) and 1(b) needs to be used for addition and irradiation, the experimental amount is much smaller than that of the traditional forming experiment, and the amount of material is also much smaller than that of the traditional forming experiment.

After the preferred concentration range of the light absorber is determined, as shown in FIG. 3(b), the photocurable material to be measured is prepared according to the preferred concentration range of the light absorber, and a photorheological test is performed. It should be noted that the optical density on a photorheological test platform and the optical density on a forming surface of a DLP photocuring platform should be adjusted to the same level before the test. The results of the photorheological test are shown in FIG. 3(a). As an exposure time of the UV light to the material increases, a storage modulus of the material (indicated by the continuous line in FIG. 3(a)) suddenly increases and crosses a dissipative modulus (indicated by the dotted line in FIG. 3(a)). An intersection point corresponds to a gel point of the material, that is, a starting point for the photocurable material to transform from a liquid state to a solid state. The corresponding exposure time is the time when the material accumulates energy and begins to transform from liquid to solid, that is, a curing threshold time $t_T$.

In Step 1, the preferred concentration range of the light absorber in the material is determined, and the corresponding solid absorbance $A_s$ per unit thickness and liquid absorbance $A_l$ per unit thickness are measured. The curing threshold time $t_T$ of the material is measured in Step 2. The three values are input into a theoretical model of the present invention:

$$t_H = t_T \cdot \left[ \frac{A_s - A_l}{A_s} + \frac{A_l}{A_s} \cdot e^{(-A_s \cdot H)} \right]$$

where, $t_H$ is the exposure time corresponding to the curing thickness H, and e is a natural constant.

In actual printing, the desired curing thickness H is substituted into the single-layer curing model to obtain the exposure time $t_H$, so as to realize DLP printing control.

The traditional method to determine the DLP printing parameters through forming experiments requires a lot of material to determine the curing thickness at the forming time, and uses discrete data point fitting to obtain the relationship between the exposure time and the forming thickness. The traditional method relies on the material to have an accurately measurable structure, relies on many discrete data points to achieve accuracy. In addition, the traditional method wastes the material and is not straightforward.

The present invention obtains the relationship between the exposure time and the curing thickness by introducing the following property parameters of the material: the liquid absorbance per unit thickness, the solid absorbance per unit thickness, and the curing threshold time. The present invention enables a more accurate relationship and saves the material. The present invention eliminates errors between actual forming results and theoretical prediction results by adding a light absorber. The present invention obtains the preferred concentration range of the light absorber by comparing the change trend of the actual value and the theoretically predicted value of the solid-liquid absorbance ratio. The present invention improves the accuracy of the obtained DLP printing parameters, saves the material and improves efficiency.

Furthermore, the material property parameters involved in the present invention are independent of the mechanical properties of the material. When it is hard to obtain the relationship between the exposure time and the forming thickness through forming experiments for soft hard-to-form materials with poor mechanical properties, the method of the present invention can still obtain an accurate relationship between the exposure time and the forming thickness.

What is claimed is:
1. A control method for digital light processing (DLP) printing based on an absorbance of a photocurable material, comprising: adding a light absorber to the photocurable material, and subjecting the photocurable material with the light absorber to photocuring for DLP printing, wherein a printing process comprises:

1) measuring a liquid absorbance $A_l$ and a solid absorbance $A_s$ per unit thickness of the photocurable material with the light absorber under different concentrations of the light absorber;

2) calculating a ratio of the liquid absorbance $A_l$ to the solid absorbance $A_s$ per unit thickness that change with the concentrations of the light absorber as an actual solid-liquid absorbance ratio $R_{sl}$;

$$R_{sl} = A_s/A_l$$

3) comparing the actual solid-liquid absorbance ratio with a theoretically predicted value of a solid-liquid absorbance ratio:

when a difference between the actual solid-liquid absorbance ratio and the theoretically predicted value of the solid-liquid absorbance ratio reaches more than 10% of the theoretically predicted value of the solid-liquid absorbance ratio, determining that the actual solid-liquid absorbance ratio deviates from the theoretically predicted value of the solid-liquid absorbance ratio, and taking a concentration range of the light absorber corresponding to the deviating actual solid-liquid absorbance ratio as an actual concentration of the light absorber in the photocurable material;

4) determining, by a photorheological test, a curing threshold time $t_T$ of the photocurable material under the concentration of the light absorber determined in step 3);

5) substituting the solid absorbance per unit thickness, the liquid absorbance per unit thickness and the curing threshold time of the photocurable material into a single-layer curing model as follows to obtain a relationship between an exposure time $t_H$ and a curing thickness H:

$$t_H = t_T \cdot \left[ \frac{A_s - A_l}{A_s} + \frac{A_l}{A_s} \cdot e^{(-A_s \cdot H)} \right]$$

wherein, $t_T$ denotes the curing threshold time, H denotes the curing thickness, and e denotes a natural constant;

6) substituting, in actual printing, a desired curing thickness H into the single-layer curing model to obtain the exposure time $t_H$, and performing a DLP printing control according to the exposure time $t_H$.

2. The control method for DLP printing based on the absorbance of the photocurable material according to claim 1, wherein in step 3), the theoretically predicted value $R_{sl}'$ of the solid-liquid absorbance ratio is calculated as follows:

$$R'_{sl} = \frac{a_1 c_d + b_1}{a_2 c_d + b_2}$$

wherein, $R_{sl}'$ denotes the theoretically predicted value of the solid-liquid absorbance ratio; $a_1$ denotes a slope of linear fitting data of a relationship between the solid absorbance per unit thickness and a concentration of the light absorber; $a_2$ denotes a slope of linear fitting data of a relationship between the liquid absorbance per unit thickness and the concentration of the light absorber; $b_1$ denotes an intercept of the linear fitting data of the relationship between the solid absorbance per unit thickness and the concentration of the light absorber; $b_2$ denotes an intercept of the linear fitting data of the relationship between the liquid absorbance per unit thickness and the concentration of the light absorber; and $c_d$ denotes the concentration of the light absorber.

3. The control method for DLP printing based on the absorbance of the photocurable materials according to claim 1, wherein: in step 1), the liquid absorbance $A_l$ and the solid absorbance $A_s$ per unit thickness are measured by an absorbance measuring apparatus; the absorbance measuring apparatus comprises a transparent upper end cover, a tank wall and a transparent lower end cover; the transparent upper end cover and the transparent lower end cover are connected through the tank wall; the transparent upper end cover, the tank wall and the transparent lower end cover together form a sealed tank; an ultraviolet (UV) light source is provided above the transparent upper end cover; a photometer is provided under the tank; and the photometer is connected to a display screen.

4. The control method for DLP printing based on the absorbance of the photocurable material according to claim 3, wherein a measuring process of the absorbance measuring apparatus comprises:

keeping the tank as an empty tank, wherein no material is placed in the tank; emitting, by the UV light source, UV light vertically into the tank from above the transparent upper end cover; receiving, by the photometer under the tank, the UV light passing through the empty tank at a photosensitive position; and displaying, by the display screen of the photometer, an optical density as an incident optical density $I_i$;

placing a photocurable material to be measured into the tank, wherein the photocurable material to be measured fully fills the tank; emitting, by the UV light source, UV light vertically into the tank from above the transparent upper end cover; receiving, by the photometer under the tank, the UV light passing through the photocurable material, at the photosensitive position; and displaying, by the display screen of the photometer, an initial optical density as a liquid outgoing optical density $I_{lo}$ of the UV light passing through the photocurable material with a thickness of (h);

continuously emitting, by the UV light source, UV light for irradiating, wherein the photocurable material begins to transform from the liquid state to a solid state; displaying, by the display screen of the photometer, a value of an optical density remaining stable over time; and taking the value as a solid outgoing optical energy density $I_{so}$ of the UV light passing through the photocurable material with the thickness of (h); and calculating the liquid absorbance $A_l$ and the solid absorbance $A_s$ per unit thickness according to the following formulas:

$$A_l = \frac{1}{h} \cdot \ln\left(\frac{I_{lo}}{I_i}\right)$$

$$A_s = \frac{1}{h} \cdot \ln\left(\frac{I_{so}}{I_i}\right)$$

wherein, h is the thickness of the photocurable material fully filling the tank.

* * * * *